(12) United States Patent
Shiramatsu et al.

(10) Patent No.: US 8,767,338 B2
(45) Date of Patent: Jul. 1, 2014

(54) MAGNETIC HEAD SLIDER AND MAGNETIC DISK DRIVE

(75) Inventors: Toshiya Shiramatsu, Kanagawa (JP);
Masayuki Kurita, Kanagawa (JP);
Hidekazu Kohira, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 659 days.

(21) Appl. No.: 12/973,301

(22) Filed: Dec. 20, 2010

(65) Prior Publication Data
US 2011/0149430 A1 Jun. 23, 2011

(30) Foreign Application Priority Data
Dec. 21, 2009 (JP) ................................. 2009-288714

(51) Int. Cl.
*G11B 21/02* (2006.01)
*G11B 5/60* (2006.01)

(52) U.S. Cl.
USPC ........................................ 360/75; 360/234.4

(58) Field of Classification Search
None
See application file for complete search history.

(56) References Cited

U.S. PATENT DOCUMENTS

| 2008/0007871 | A1 | 1/2008 | Kiyono et al. |
| 2008/0100965 | A1 | 5/2008 | Oki |
| 2009/0323227 | A1 * | 12/2009 | Zheng et al. .................. 360/313 |
| 2010/0321828 | A1 * | 12/2010 | Burbank et al. ........... 360/234.3 |
| 2011/0069408 | A1 * | 3/2011 | Kurita et al. .................... 360/59 |

FOREIGN PATENT DOCUMENTS

| JP | 2006351115 | 12/2006 |
| JP | 2008016157 | 1/2008 |
| JP | 2008016158 | 1/2008 |
| JP | 2008112545 | 5/2008 |

* cited by examiner

*Primary Examiner* — Andrew L Sniezek

(57) ABSTRACT

A magnetic head slider is disclosed. The magnetic head slider includes a slider substrate and a laminated magnetic head element on the slider substrate. Additionally, the laminated magnetic head element includes a magnetoresistance effect element and a recording magnetic pole formed in a layer higher than the magnetoresistance effect element. A first thin-film resistor heater element is formed in a position further from an air bearing surface than the magnetoresistance effect element and the magnetic recording pole and a second film resistor heater element is formed in a layer lower than the first thin-film resistor heater element, and closer to the air bearing surface and the magnetoresistance effect element than the first heater element. A thin-film resistor sensor element is formed in a layer higher than the second thin-film heater element and closer to the air bearing surface than the second heater element.

15 Claims, 11 Drawing Sheets

MAGNETIC HEAD SLIDER AND MAGNETIC DISK DRIVE

CROSS-REFERENCE TO RELATED APPLICATION

This application claims priority from the Japanese Patent Application No. 2009-288714, filed Dec. 21, 2009, the disclosure of which is incorporated herein in its entirety by reference.

TECHNICAL FIELD

Embodiments of the present invention relate to a hard-disk drive (HDD) having a high recording density.

BACKGROUND

In general, one or more of the magnetic disks used in a hard disk drive (HDD) is provided with a plurality of data tracks and a plurality of servo tracks. Each servo track includes a plurality of servo sectors having address data. Moreover, each data track includes a plurality of data sectors containing user data. Data tracks are recorded between servo sectors separated in the circumferential direction.

The HDD is provided with an oscillating actuator, and a head slider is supported on this actuator. The HDD reads out the address data of the servo sector using the head slider, and controls the actuator with this address data. As such the HDD is able to move the head slider to the proper radial position, and then position the head there. Once positioned on the target data track, the head slider reads out data or writes in data to the target data sector within this track.

In the data readout process, signals read out from the magnetic disk by the head slider are subject to the designated signal processing such as waveform shaping or decryption by the signal processing circuit, and transferred to the host. Data transferred from the host is written into the magnetic disk by the head slider after receiving the designated processing by the signal processing circuit in the same way.

As described above, control of the positioning of the head slider is carried out using servo data on the magnetic disk. The servo sector includes the cylinder ID, sector number, burst pattern and the like. The cylinder ID indicates the track address while the sector number indicates the sector address within the track. The burst pattern has data on the position of the magnetic head relative to the track. The servo track is comprised of a plurality of servo sectors separated in the circumferential direction, and sectors which span all the servo tracks have their positions aligned in the circumferential direction.

Servo data is written into the magnetic disk in the factory before the HDD is shipped as a product. At present the process of writing in the servo tracks occupies a part of the manufacturing cost of the HDD. Self-servo writing (SSW) uses the mechanical mechanism of the HDD itself as a mechanism for servo writing, controlling the spindle motor and the voice coil motor within the HDD from an external circuit using the external circuit to write in the servo patterns. This enables the servo track writer (STW) to be eliminated, contributing to a reduction in HDD manufacturing costs.

SSW uses the fact that the positions of the read element and write element in the head element unit differ in the radial direction. This separation is known as the read/write offset. Thus the self-propagation of servo sectors into which new tracks are written presumes that the precision of the servo sectors read out in the radial direction will be carried on unchanged in the new newly written servo sectors. However, due to various factors that cause errors to occur, this precision deteriorates in the process of propagation. Deterioration in the precision of positioning causes discrepancies in the proper position for a servo sector, and this is carried on in subsequent propagations.

Moreover, this process also depends on the characteristics of the servo loop that enables the head element unit to execute track following. Deterioration in precision is a complex mechanism involving a number of factors. In this way track shape errors accumulate in regions with frequencies where the gain of the closed loop transmission characteristics exceeds 1 due to repeated propagation and writing operations during SSW.

With conventional techniques, the operation control program has to measure and model the closed loop characteristics for the servo system in advance. However, the actual transmission characteristics for the magnetic disk differ slightly due to a variety of causes. As a result, there can be a discrepancy in characteristics between the servo system model and the actual servo system. For example, with respect to accurately acquiring communication characteristics for low-frequency regions in the vicinity of the first-order component of magnetic disk rotation. As a result, SSW cannot apply an appropriate correction to the servo system, and track shape errors can grow with repeated propagation and writing.

SUMMARY

A magnetic head slider is disclosed. The magnetic head slider includes a slider substrate and a laminated magnetic head element on the slider substrate. Additionally, the laminated magnetic head element includes a magnetoresistance effect element and a recording magnetic pole formed in a layer higher than the magnetoresistance effect element. A first thin-film resistor heater element is formed in a position further from an air bearing surface than the magnetoresistance effect element and the magnetic recording pole and a second film resistor heater element is formed in a layer lower than the first thin-film resistor heater element, and closer to the air bearing surface and the magnetoresistance effect element than the first heater element. A thin-film resistor sensor element is formed in a layer higher than the second thin-film heater element and closer to the air bearing surface than the second heater element.

DESCRIPTION OF THE DRAWINGS

The accompanying drawings, which are incorporated in and form a part of one embodiment, illustrate embodiments of the invention and, together with the description, serve to explain an embodiments of the present invention.

DESCRIPTION OF EMBODIMENTS

Figure 1:
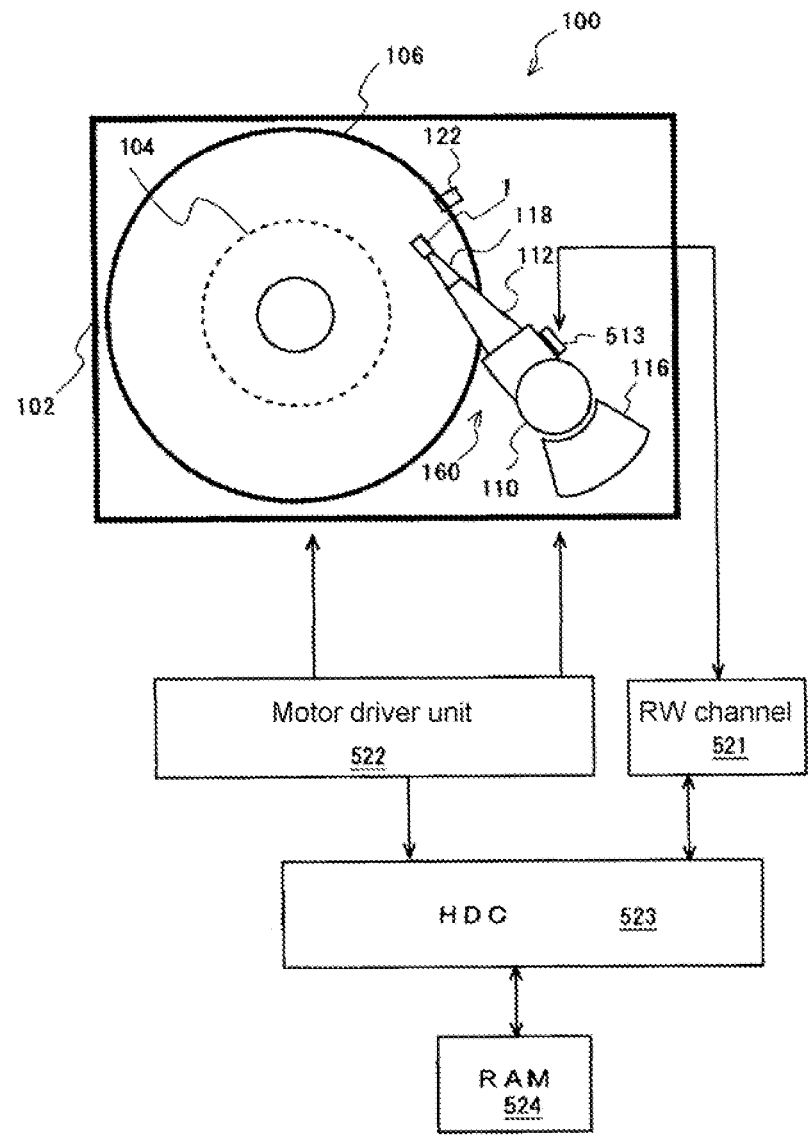
FIG. 1 is a plan view of a hard-disk drive (HDD) in accordance with an embodiment of the present invention.

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, embodiments of the present invention may be practiced without these specific details. In other instances, well known methods, procedures, and components have not been described in detail as not to obscure embodiments of the present invention. Throughout the drawings, like components are denoted by like reference numerals, and repetitive descriptions are omitted for clarity.

Overview

An embodiment of the invention provides determines the floating height by detecting contact between the magnetic head slider and the magnetic disk using the floating height of adjustment function. In order to sensitively detect contact between magnetic head slider and a magnetic disk, one embodiment builds a contact sensor element comprising a thin-film resistor which can detect frictional heat due to contact within the magnetic head slider in the vicinity of contact with the magnetic disk. This contact sensor element can be used to detect contact with high sensitivity.

In one embodiment, to use the contact sensor element built into the inside of the magnetic head slider, the contact sensor element position may be constantly close to the lowest point of the magnetic head slider. However, thermal distortion occurs in the vicinity of the recording element and the playback elements with changes in temperature in the magnetic head element unit in a magnetic head slider. In this way, the lowest point of the magnetic head slider varies with its conditions of use.

There are two types of thermal distortion due to temperature changes in the magnetic head element unit, one of which is thermal expansion due to recording current. More specifically, when a recording current flows in the coil, excess current loss is generated in the magnetic pole due to electromagnetic induction, causing the generation of heat. Moreover, the coil generates heat due to the recording current. The combined heat generated heats the vicinity of the recording and playback elements of the magnetic element unit, and the resultant thermal expansion causes a thermal protrusion in the order of nanometers.

The other type of thermal expansion is due to a rise in the environmental temperature. There is a difference in the linear expansion coefficients of the magnetic shield in the vicinity of the recording and playback elements, the metal material of the magnetic pole and the resin materials, and the ceramic material in parts other than these. This difference in the linear expansion coefficient causes a local thermal protection in the order of nanometers.

Moreover, the lowest point of the magnetic head slider is greatly influenced also by the individual differences in the processed step shape of the air bearing surface in the vicinity of the recording and playback element created when forming the air bearing surface. In one embodiment, the lowest point will differ for each magnetic head slider.

As described above, where the lowest point for the magnetic head slider differs for each magnetic head slider and condition of use, there is the possibility that a situation will occur where the contact sensor element is positioned in a location away from the lowest point of the magnetic head slider, and that the contact sensor element is unable to effectively detect contact between the magnetic head slider and the magnetic disk.

In one embodiment, when adjusting the floating height with a heater element the float height in the position of the recording element may be extremely small with the recording element in the lowest position. However, if the design of the heater element for adjusting the floating height gives priority to having the recording element in the lowest position, the floating height of the playback element position will increase, and there is the difficulty that the floating height in the position of the playback element enlarges. At present, it is extremely difficult to have a single heater element for adjusting the floating height positioned close to the lowest point of the magnetic head slider for both the recording element and the playback element.

For this reason, one embodiment positions the recording element and playback element as well as the contact sensor element close to the lowest point of the magnetic head slider.

Further Detail

For convenience sake, omissions and simplifications have been made in the following description and drawings to clarify the explanation. Furthermore, in the drawings, the same elements are keyed with the same symbols, and repeated descriptions have been omitted for the sake of clarity. In what follows, an embodiment of the invention will be described using a hard disk drive (HDD) as an example of a disk drive.

In one embodiment, FIG. 1 shows the outline structure of HDD 100 that includes an enclosure 102, with spindle motor 104, bearing unit 110, and VCM magnetic circuit 116 being attached to enclosure 102. Spindle motor 104 has magnetic disk 106 attached to it, with magnetic disk 106 being driven and rotated by spindle motor 104. Bearing unit 110 supports head arm 112 and a VCM coil, the VCM coil being positioned in the magnetic field of VCM magnetic circuit 116.

Suspension 118 is attached to the tip of head arm 112, suspension 118 supporting magnetic head slider 1. The assembly of suspension 118 and magnetic head slider 1 is referred to as the head gimbal assembly. Suspension 118, head arm 112, bearing unit 110 and VCM coil comprise actuator 160. Actuator 160 is an example of a moving mechanism for magnetic head slider 1. The assembly comprising actuator 160 and magnetic head slider 1 is referred to as the head slider assembly.

Actuator 160 rotates in bearing unit 110, and moves magnetic head slider 1 in the radial direction of magnetic disk 106. Magnetic head slider 1 is provided with load by means of suspension 118 and floats above magnetic disk 106 with a floating height of around 10 nm or less than 10 nm.

During the seek operation, magnetic head slider 1 moves in the radial direction of magnetic disk 106 by means of rotating actuator 160, and accesses magnetic disk 106. The access is a subordinate concept to recording and playback. Actuator 160 is moved from magnetic disk 106 to ramp 122 when HDD 100 is at rest or the read/write life has no fixed time. At this time, magnetic head slider 1 is positioned on the outside of magnetic disk 106. HDD 100 is a ramp load/unload type HDD, but the invention may also be applied to a contact start/stop type HDD where magnetic head slider 1 rests in a particular sector of magnetic disk 106.

Various circuits are mounted on the circuit board attached to the outside of enclosure 102. Motor driver unit 522 drives spindle 104 and VCM magnetic circuit 116 according to control data from HDC 523. Arm electronics (AE) 513 which is the head IC is an integrated circuit, and may be positioned within enclosure 102. AE 513 chooses head slider 1 which accesses magnetic disk 106 from a plurality of head sliders 1 in accordance with control data from HDC 523, and amplifies the read/write signal.

Moreover, AE 513 supplies power to the heater element of head slider 12 selected in accordance with control data from HDC 523, and functions as a power supply adjustment circuit which adjusts its electric power. Moreover, AE 513 uses the contact sensor element 2 to monitor the contact between head slider 1 and magnetic disk 106, and has the function of detecting contact. When the contact sensor detects contact, AE 513 notifies this to HDC 523.

RW channel 521 extracts data from the read signal supplied from AE 513 in the read process, and carries out a decoding process. The decoded data is supplied to HDC 523. Moreover, in the write process, the write data supplied from HDC 523 is code modified, and the code modified data is further converted to a write signal and supplied to AE 513.

HDC 523 which is the controller comprises MPU and a hardware logic circuit. HDC 523 executes overall control of HDD 100 and carries out the processes relating to data management such as read/write process control, management of the command execution sequence, control of the head positioning using a servo signal, control of the interface with the host, defect management and processes for dealing with errors. HDC 523 controls AE 513 by storing control data in the control register of AE 513. RAM 524 has the function of a sector buffer which temporarily stores user data in addition to firmware for HDC 523.

Figure 2:
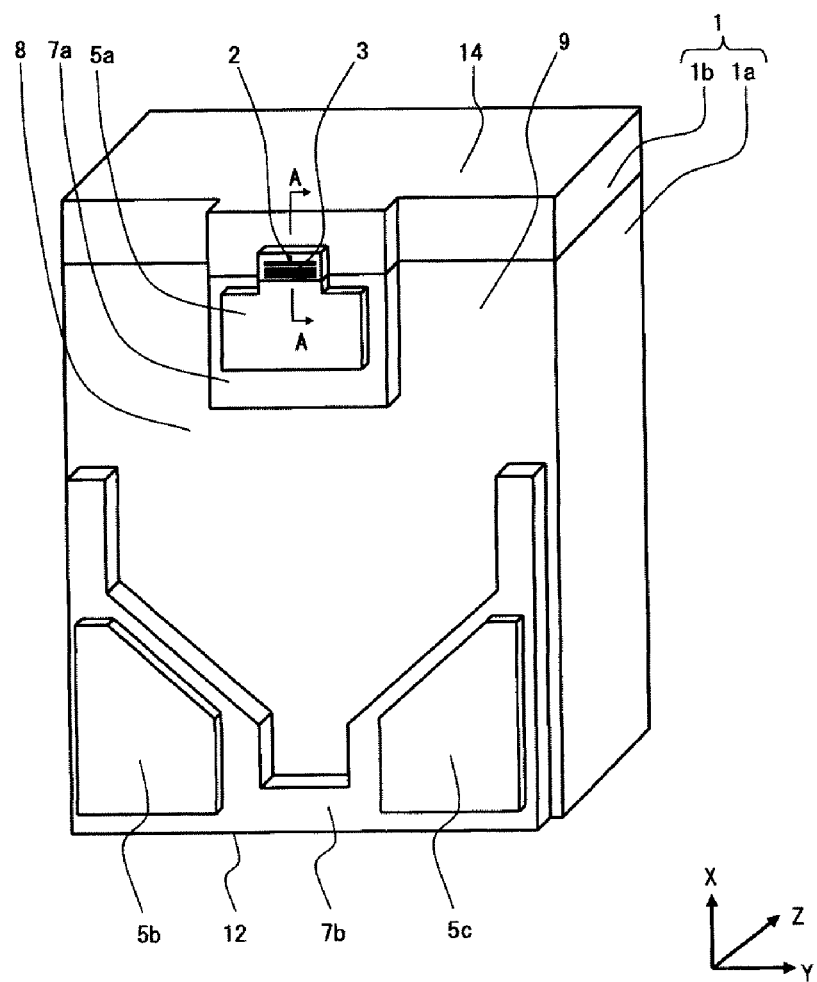
FIG. 2 is a block diagram of a magnetic head slider in accordance with an embodiment of the present invention.

With reference now to FIG. 2 one embodiment of a diagram which schematically illustrates the structure of magnetic head slider 1 in FIG. 1 is shown. Magnetic head slider 1 comprises slider substrate 1a of a ceramic material typified by a sintered body (altec) of aluminum or titanium carbide, and a thin-film magnetic head part 1b. Thin-film magnetic head part 1b is a laminated magnetic head element formed in a thin-film process on the element-forming surface of slider substrate 1a. Thin-film magnetic head portion 1b comprises such elements as magnetic recording element 2, magnetic playback element 3, two thin-film resistor heater elements (4 and 40 in FIG. 3), a contact sensor element (41 in FIG. 3) and a protective insulating film (16 in FIG. 3).

Magnetic head slider 1 has an approximately rectangular shape with a length of 0.85 mm, a width of 0.7 mm and a thickness of 0.23 mm in a magnetic head slider 1 known as a femto, for example, and has a total of six surfaces comprising air bearing surface 9, air inflow end 12, air outflow end 14, both side surfaces, and the back surface. Air bearing surface 9 is provided with minute steps through a process such as ion milling or etching, generating air pressure against the magnetic disk, which has the function of an air bearing that supports the load on the back surface.

Air bearing surface 9 provided with the steps described above is in practice divided into 3 parallel surface types. The 3 types are floating parts 5a, 5b, 5c which are closest to the disk, shallow slot surfaces 7a, 7b which are step bearing surfaces approximately 100 nm to 200 nm deeper than floating parts 5, and deep slot surface 8 which is approximately 1 μm deeper than floating parts 5. The flow of air generated when the magnetic disk rotates is compressed due to the tapering flow path when moving toward floating parts 5b, 5c from step bearing shallow slot surface 7b, generating a positive air pressure. At the same time a negative air pressure is generated by the expansion of the flow path when the airflow moves towards deep slot surface 8 from floating parts 5b, 5c and shallow slot surface 7b. In one embodiment, the illustration of the steps and slot depths in FIG. 2 are exaggerated.

Magnetic head slider 1 is designed to float in such a way that the floating height on the side of air inflow end 12 is greater than the floating height on the side of air outflow end 14. For this reason element-installed surface 5a in the vicinity of the outflow end comes closest to the disk. In the vicinity of the outflow end, element-installed surface 5a projects from the surrounding shallow slot surface 7a and deep slot surface 8, so element-installed surface 5a comes closest to magnetic disk 106 as long as the pitch and roll of the slider does not tilt beyond a certain limit.

Magnetic recording element 2 and magnetic playback element 3 are formed within thin film part 1b of element-installed surface 5a. The load applied by suspension 118 is carefully balanced by the positive air pressure load generated at air bearing surface 9, the configuration of air bearing surface 9 being designed so that the distance from magnetic recording element 2 and magnetic playback element 3 to the disk is around 10 nm or some suitable value less than this. A protective film of carbon with a thickness of a few nanometers is formed on element-installed surface 5a which has the highest possibility on air bearing surface 9 of coming into contact with magnetic disk 106, to ensure there is no friction even where there is slight contact with the disk for a short time, and to prevent corrosion of recording element 2 and playback element 3.

In one embodiment, magnetic head slider 1 is a two-step bearing slider in which air bearing surface 9 is effectively formed from 3 types of parallel surface, such as, for example, a parts surface, a shallow slot surface and a deep slot surface with different depths, but may also be a step bearing slider with 3 or more steps formed from 4 or more parallel surfaces.

Figure 3:
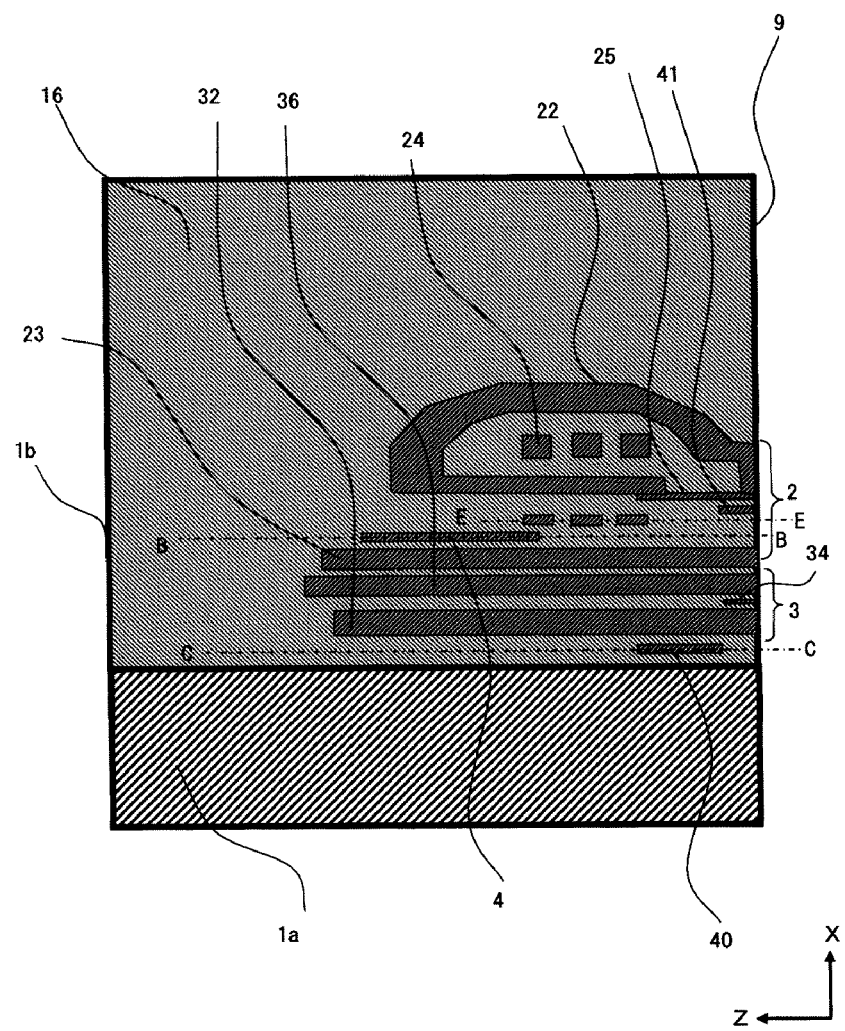
FIG. 3 is a cross-section through the line A-A in FIG. 2 in accordance with an embodiment of the present invention.

FIG. 3 illustrates an enlarged cross-section (through the line A-A) of thin-film magnetic head part 1b on which are formed recording and playback elements 2, 3 of the magnetic head slider 1 shown in FIG. 2. Thin-film magnetic head part 1b is formed using a thin-film process such as plating, sputtering or polishing on altec substrate 1a. Layers are formed on altec substrate 1a sequentially from the bottom layer upwards. Thus for one layer, the layer closest to altec substrate 1a is the bottom layer, and the layer furthest from altec substrate 1a is the top layer. As described above, thin-film magnetic head part 1b is formed on air outflow end 14. For this reason, the lowest layer is on the leading edge and the uppermost layer is on the trailing edge.

Thin-film magnetic part 1b is provided with magnetic playback element 3 of a magnetoresistance type which detects changes in the magnetic field, magnetic recording element 2 of the inductive type which records magnetic data, and a surrounding protective film 16. Magnetic recording element 2 is formed in a layer above playback element 3. In other words, magnetic playback element 3 is positioned closer to altec substrate 1a than magnetic recording element 2. Furthermore, the bottom layer of magnetic recording element 2 is in a layer above the uppermost layer of magnetic playback element 3. Protective film 16 is generally of alumina ($Al_2O_3$).

In what follows the distance between the elements and altec substrate 1a is defined as the distance to altec substrate 1a from a position at the center of the element in the direction in which the elements are laminated. In one embodiment, magnetic recording element 2 shown in FIG. 3 is a perpendicular magnetic recording element, but the invention can be applied to a magnetic head slider with a recording element within its surface. Part of magnetic recording element 2 and part of magnetic playback element 3 may be in common. The common parts are part of both elements.

Magnetic playback element 3 is laminated from the lower layer to the upper layer, and is provided with lower magnetic shield 32, magnetoresistance effect element 34, and upper magnetic shield 36. In this structure, magnetic playback element 3 comprises these three elements. Magnetic playback element 3 reads out magnetic data on magnetic disk 106 by sensing the value of the resistance of magnetoresistance effect element 34 which changes with the magnetic field from magnetic disk 106. Various formats are known for the laminated structure of magnetoresistance effect element 34. However, it is possible to apply the invention to a head slider having a magnetoresistance effect element with any structure and a playback element with any structure.

Lower magnetic shield 32, magnetoresistance effect element 34 and upper magnetic shield 36 respectively reach as far as air bearing surface 9 of protective film 16. In the read-out of magnetic data, one embodiment ensures that the magnetic spacing of magnetoresistance effect element 34 is small. In one embodiment, the magnetic spacing of the elements is the distance from the end surface of the element on the air bearing surface side to the surface of the magnetic recording layer of magnetic disk 106. The distance of an element from air bearing surface 9 is the distance from the center of an element to air bearing surface 9 in the direction of float.

To prevent leakage of noise into magnetoresistance effect element 34, the dimensions of magnetic shield 32, 36 in the direction of float may be larger than magnetoresistance effect element 34, as shown in the structure in FIG. 3. In this structure, the distance from air bearing surface 9 of magnetic shields 32, 36 is also larger than magnetoresistance element 34.

Magnetic recording element 2 is provided with lower magnetic pole 23, write coil 24, main magnetic pole 25 which is the recording pole, and upper magnetic pole 22, laminated from the lower layer to the upper layer. The above sequence follows the sequence of the lowest surface of each element. In this structure, recording element 2 mainly comprises these structural elements. The invention can be applied to magnetic head sliders fitted with recording elements having other coil structures or magnetic pole configurations.

In this example, lower magnetic pole 23 is formed on a layer above upper magnetic shield 36 of magnetic playback element 3. Main magnetic pole 25 is formed on a layer above lower magnetic pole 23, and write coil 24 is formed to sandwich main magnetic pole 25 in the direction of lamination. Main magnetic pole 25 is bonded with upper magnetic pole 22. In the recording of magnetic data, one embodiment may reduce the magnetic spacing of main magnetic pole 25.

In one embodiment, magnetic pole 25 is exposed on air bearing surface 9 of protective film 16. Magnetic recording element 2 generates a magnetic field from main magnetic pole 25 using a current which flows in write coil 24, and records magnetic data in the magnetic recording layer of magnetic disk 106. The magnetic field from main magnetic pole 25 returns to lower magnetic pole 23 passing through the magnetic recording layer of recording disc 106.

Thin-film magnetic part 1b is also provided with contact sensor element 41. Contact sensor element 41 is a thin-film resistor, and detects frictional heat caused by contact. AE 513 detects contact between magnetic head slider 1 and magnetic disk 106 by monitoring changes in its resistance. Protective film 16 covers magnetic recording element 2, magnetic playback element 3, thin-film resistor heater elements 4, 40 and contact sensor element 41, and insulates these from each other.

To detect contact with the head disk sensitively, contact sensor element 41 is formed in a position as close as possible to air bearing surface 9 of protective film 16. In one embodiment, the disk end of contact sensor element 41 reaches as far as air bearing surface 9. Moreover, contact sensor element 41 is formed in a position closer to main magnetic pole 25 than magnetoresistance effect element 34 of playback element 3.

For this reason contact sensor element 41 is positioned as close as possible to main magnetic pole 25 in the vicinity of main magnetic pole 25. In one embodiment, as shown in FIG. 3, contact sensor element 41 is in the layer immediately below main magnetic pole 25, and between the lower layer of write coil 24 and main magnetic pole 25 in the direction of lamination.

Thin-film magnetic head part 1b also has two heater elements 4, 40 for adjusting the floating height. The two heater elements 4, 40 respectively comprise thin-film resistors, one being first thin-film resistor heater element 4, the other being second thin-film resistor heater element 40. The heat from thin-film resistor heater elements 4, 40 causes part of thin-film magnetic head part 1b to expand and project, enabling the distance between the elements within thin-film magnetic head part 1b and magnetic disk 106 to be reduced.

Moreover, one embodiment obtains an appropriate air bearing surface profile for thin film magnetic head part 1b by providing thin-film magnetic head part 1b with two heater elements 4, 40 for adjusting floating height. One embodiment may also be applied to a magnetic head slider having three or more heater elements for adjusting floating height. From the point of view of simplifying structure and control, in one embodiment, two heater elements are provided for adjusting the floating height.

In one embodiment, first thin-film resistor heater element 4 and second thin-film resistor heater element 40 play different roles in adjusting the floating height. First thin-film heater element 4 has the function of a heater element for adjusting the floating height for both magnetic recording element 2 and magnetic playback element 3. Second thin-film resistor heater element 40 mainly has the function of a heating element for adjusting the floating height of magnetic playback element 3. Second thin-film resistor heater element 40 is formed in a position closer to magnetoresistance effect element 34 than main magnetic pole 25 due to this function.

Magnetic playback element 3 is formed in a layer lower than magnetic recording element 2, being formed in a position close to altec substrate 1a. The coefficient of expansion of altec substrate 1a is smaller than that of thin-film magnetic head part 1b. Moreover, the thermal emission of altec substrate 1a is better than that of thin-film magnetic head part 1b, and disperses here. For this reason the heat expansion due to the heating elements tends to be less for magnetic playback element 3 close to altec substrate 1a than for magnetic recording element 2 further from altec substrate 1a. For this reason, one embodiment ensures that magnetoresistance effect element 34 is more accurately positioned closer to the lowest point by providing second thin-film resistor heater element 40 in addition to first thin-film resistor heater element 4.

As described above, the heat from first thin-film resistor heater element 4 causes both magnetic recording element 2 and magnetic playback element 3 to project. First thin-film resistor heater element 4 is positioned further from air bearing surface 9 than magnetoresistance effect element 34 and main magnetic pole 25. The heat from heater element 4 is able to effectively control the projection of magnetoresistance effect element 34 and main magnetic pole 25 by having first thin-film resistor heater element 4 formed in the above position as the heat is radiated from air bearing surface 9.

Moreover, the stroke due to first thin-film resistor heater element 4 may be larger than the stroke due to second thin-film resistor heater element 40 because of the projection of magnetic recording element 2 mainly caused by heat from first thin-film resistor heater element 4. First thin-film resistor heater element 4 is a heater element for adjusting floating height with a large stroke for both magnetic recording element 2 and magnetic playback element 3, and the amount of heat emitted by first thin-film resistor heater element 4 is larger than the amount of heat emitted by second thin-film resistor heater element 40.

One embodiment avoids deterioration in magnetoresistance effect element 34 due to direct heating from first thin-film heater element 4 by forming first thin-film resistor heater element 4 in a position further to the rear of air bearing surface 9 than magnetoresistance effect element 34 and main magnetic pole 25. As described above, the distance of the elements from air bearing surface 9 is defined using a position at the center of the elements as the reference.

Furthermore, as shown in the example in FIG. 3, first thin-film resistor heater element 4 is positioned between magnetoresistance effect element 34 and main magnetic pole 25 in the direction of lamination. The thermal expansion due to the heater elements is in general larger on the upper layer side then the lower layer side of the heater element. First thin-film resistor heater element 4 between magnetoresistance effect element 34 and main magnetic pole 25 is able to effectively project magnetic recording element 2 and also provide appropriate heat to playback element 3.

Second thin-film resistor heater element 40, as described above, is a heater element which mainly functions to control the projection of element 3. For this reason second thin-film resistor heater element 40 is positioned on a layer lower than first thin-film resistor heater element 4, and is positioned closer to magnetoresistance effect element 34 than first thin-film resistor heater element 4. Moreover, second thin-film resistor heater element 40 is positioned closer to air bearing surface 9 than first thin-film resistor heater element 4.

In the example shown in FIG. 3, second thin-film resistor heater element 40 is formed on a layer lower than magnetoresistance effect element 34, and moreover is formed on a layer lower than magnetic shield 32. Second thin-film resistor heater element 40 ensures that the expansion rate of the upper layer parts is greater than the lower layer parts, and thus the heat from second thin-film resistor heater element 40 which is between slider substrate 1a and lower magnetic shield 32 is effectively able to bring magnetic playback element 3 closer to magnetic disk 106.

Second thin-film resistor heater element 40 is a heater element for adjusting the floating height mainly with the purpose of a local thermal expansion for magnetic playback element 3. The target range for the thermal expansion is smaller than first thin-film resistor heater element 4. As such, in one embodiment, the size of second thin-film heater resistor element 40 is smaller than the size of first thin-film resistor heater element 4. The surface area of second thin-film resistor heater element 40 is less than half the surface area of first thin-film resistor heater element 4. One embodiment accurately controls the projection of magnetic playback element 3 by positioning a small compact thin-film resistor heater element 40 close to magnetic playback element 3.

Control of the profile of air bearing surface 9 causes a large thermal expansion due to first thin-film resistor heater element 4, and may cause a small local thermal expansion due to second thin-film resistor heater element 40. HDC 523 provides power to first thin-film resistor heater element 4 and second thin-film resistor heater element 40 by controlling AE 513. In controlling the floating height, HDC 523 supplies more power via AE 513 to first thin-film resistor heater element 4 than to second thin-film resistor heater element 40. One embodiment positions both main magnetic pole 25 and magnetoresistance effect element 34 close to the lowest point using these two thin-film resistor heater elements 4, 40.

Contact sensor element 41 is a sensor element for detecting contact between magnetic head 1 and magnetic disk 106. For this reason contact sensor element 41 is typically structured as a thin-film resistor smaller than second thin-film resistor heater element 40. The surface area of contact sensor element 41 is less than half of the surface area of second thin-film resistor heater element 40. One embodiment raises the sensitivity with which contact sensor element 41 detects contact. As described above, contact sensor element 41 may be provided close to air bearing surface 9, and is provided closer to air bearing surface 9 than second thin-film resistor heater element 40. Contact sensor element 41 may be positioned close to the main magnetic pole 25, and is formed in a layer closer to main magnetic pole 25 than first thin-film resistor heater element 4 in the direction of lamination.

Figure 4:
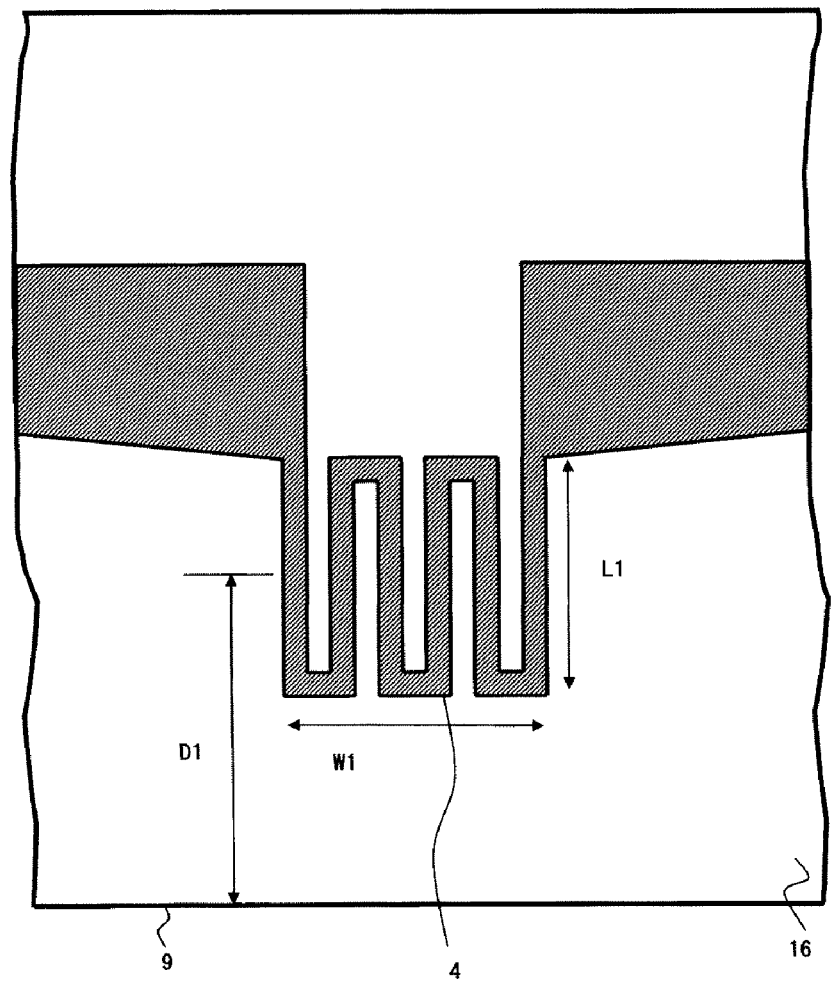
FIG. 4 is a cross-section view of the structure of a first heater element in accordance with an embodiment of the present invention.

In what follows, a description will now be given of one embodiment of a structure for first thin-film heater resistor element 4, second thin-film resistor heater element 40, and contact sensor element 41. These are examples of the structure, and the invention is not limited to these. FIG. 4 illustrates the view from the output end of first thin-film resistor heater 4 (a cross-section through the line B-B) in FIG. 3. In the structure shown in FIG. 4, first thin-film resistor heater element 4 for adjusting the floating height is a thin-film resistor formed from fine wire material of nickel chrome (NiCr), with a thickness of approximately 0.1 µm and a width of approximately 2 µm.

The fine wire winds around a region with a depth L1 of approximately 15 µm and a width W1 of approximately 15 µm. The gaps between the fine wires are filled with alumina (Al$_2$O$_3$) and the value of the resistance is approximately 100Ω. The distance of first thin-film resistor heater element 4 from air bearing surface 9 is shown by D1. The surface area of first thin-film resistor element 4 in this structure is expressed by W1×L1, and the larger the surface area, the larger the area that can be provided with heat.

Figure 5:
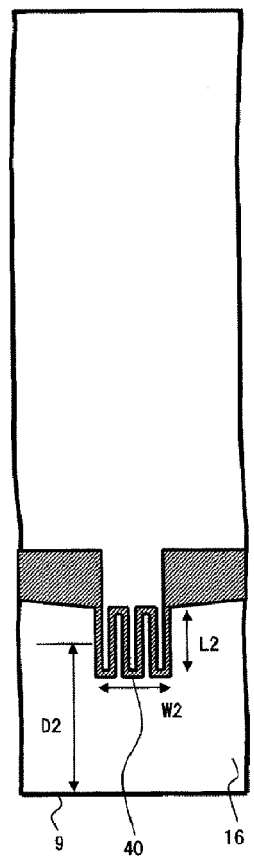
FIG. 5 is a cross-section view of the structure of a second heater element in accordance with an embodiment of the present invention.

FIG. 5 shows the view from the outflow end of second thin-film resistor heater element 40 (cross-section through the line C-C in FIG. 3). In this structure, second thin-film resistor heater element 40 is a thin-film resistor formed of the same material as first thin-film resistor heater element 4. Second thin-film resistor heater element 40 is formed from fine wire material of nickel chrome (NiCr), with a thickness of approximately 0.1 μm and a width of approximately 1 μm. The fine wire winds around an area with a depth L2 of approximately 5 μm, and a width W2 of approximately 5 μm, and the value of the resistance is approximately 20-100Ω.

The distance of second thin-film resistor heater element 40 from air bearing surface 9 is indicated by D2. The surface area of second thin-film resistor heater element 40 in this structure is expressed by W2×L2. In one embodiment, first thin-film resistor heater element 4 and second thin-film resistor heater element 40 may be configured differently to the shapes shown in the example. For example, either one or both may be fine lateral heater elements which do not wind.

Figure 6:
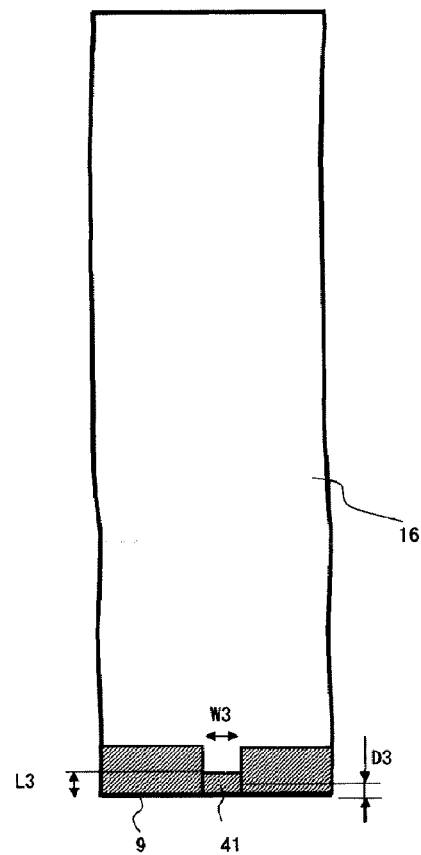
FIG. 6 is a cross-section view of the structure of a contact sensor element in accordance with an embodiment of the present invention.

FIG. 6 illustrates a view of contact sensor element 41 seen from the outflow end (cross-section through line E-E in FIG. 3). In this structure, contact sensor element 41 is a thin-film resistor formed of materials such as nickel-iron (NiFe) so as to have a surface area less than the surface area of second thin-film element resistor heater 40. Its size has a thickness of approximately 0.03 μm, width W3 is approximately 1 μm, and depth L3 is approximately 0.1 μm. The value of the resistance is approximately 30-200Ω. The distance of contact sensor element 41 from air bearing surface 9 is expressed by D3. Its surface area is expressed by W3×L3.

Figure 7:
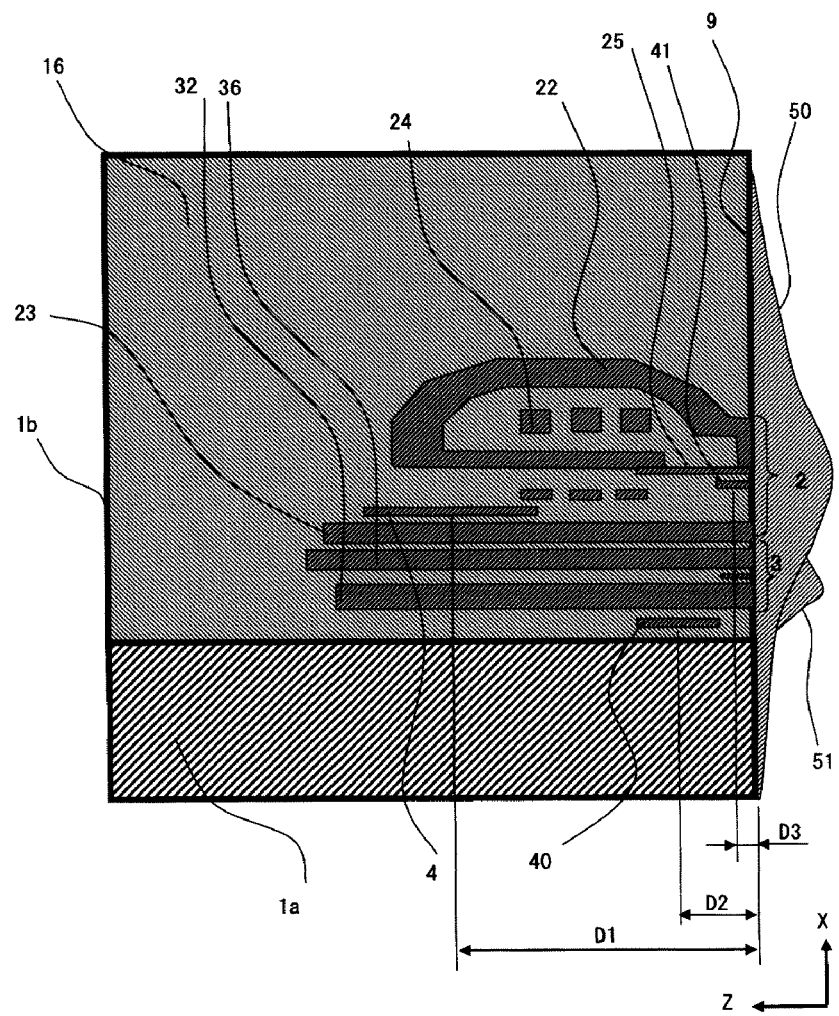
FIG. 7 is a cross-section through the line A-A in FIG. 2 showing the shape of the projection on the air bearing surface due to a heater element in accordance with an embodiment of the present invention.

The thermal projection of thin-film magnetic head part 1*b* due to first thin-film resistor heater element 4 and second thin-film resistor heater element 40 described above will now be explained in detail with reference to FIG. 7. FIG. 7 is a cross-section through the line A-A of magnetic head slider 1 shown in FIG. 2, being an exploded diagram of thin-film resistance head part 1*b* in which recording and playback element 3 is formed, in the same way as FIG. 3. As distinct from FIG. 3, FIG. 7 schematically illustrates the cross-sectional expanded shape of thin-film magnetic head part 1*b* and part of slider substrate 1*a* caused by heat from the two heater elements 4, 40.

With thermal projection shape 50 caused by first thin-film resistor heater element 4 for adjusting floating height with respect to both magnetic recording element 2, and magnetic playback element 3, the surface area of first thin-film heater resistor element 4 is large on the thin film-forming surface and its heat is conveyed to the whole of magnetic recording element 2 and magnetic playback element 3. In one embodiment, thermal project shape 50 forms a projection which spreads throughout magnetic recording element 2 and magnetic playback element 3, with the peak of the projection caused by first thin-film resistor heater element 4 being in the vicinity of recording magnetic element 2 and main magnetic pole 25.

On the other hand, with projection shape caused by second thin-film resistor heater element 40 for magnetic playback element 3, second thin-film resistor heater element 40 is smaller than first thin-film resistor heater element 4, and is formed in a position closer to the air bearing surface. For this reason the range over which heat from second thin-film resistor heater element 40 is transmitted is mainly in the vicinity of magnetic playback element 3, and the thermal projection caused by second thin-film resistor heater element 40 is limited to the vicinity of magnetic playback element 3.

Thus, in one embodiment, the vicinity of magnetic recording element 3 is at the lowest point due to first thin-film resistor heater element 4, and at this time the vicinity of magnetic playback element 3 is also to a certain extent closer to the lowest point due to first thin-film heater resistor element 4. With power supplied to first thin-film resistor heater element 4, the vicinity of magnetic playback element 3 can also be made to approach the lowest point to the same extent as recording element 2 by applying power to second thin-film resistor heater element 40.

Moreover, as contact sensor element 41 which is the smallest of the three thin-film resistors and is formed closest to the air bearing surface is formed in the vicinity of main magnetic pole 25 of magnetic recording element 2 in the direction of thin-film lamination, if main magnetic pole 25 is also at the lowest point due to first thin-film resistor heater element 4, contact sensor element 41 is also simultaneously brought to the lowest point, thereby providing sensitive detection of contact between magnetic head slider 1 and magnetic disk 106.

To control the three types of thin-film resistor, three systems of 6 wires may be used. However, one embodiment increases the number of terminals formed on protective film 16 of the element forming-surface of magnetic head slider 1 from the current 6 terminals to 10 terminals. Where the number of terminals increases, it is difficult to fit on air outflow end 14.

Figure 8:
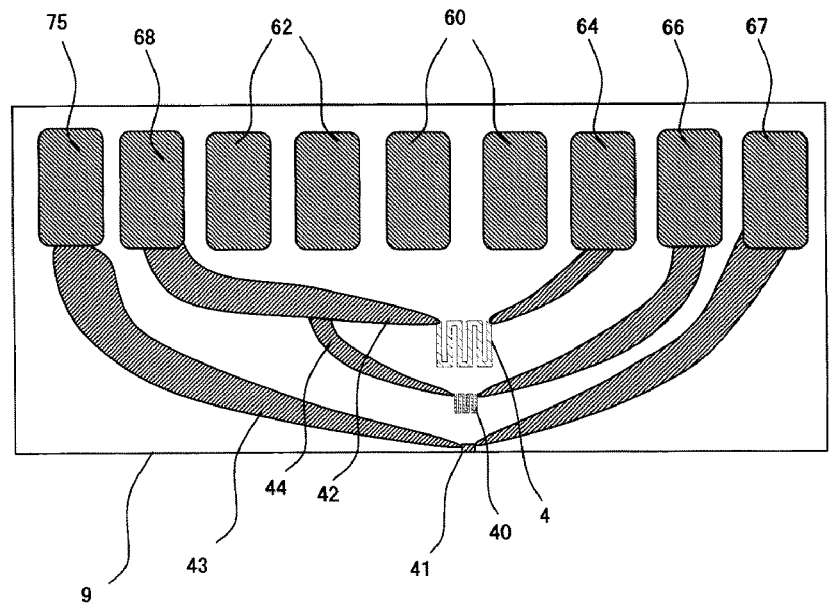
FIG. 8 is a block diagram of a 9-terminal wiring structure in the magnetic head slider in accordance with an embodiment of the present invention.

FIG. 8 is a diagram showing a view from the outflow end of a wiring structure which connects together ground wire 42 of first thin-film resistor heater element 4 and ground wire 44 of second thin-film resistor heater element 40 in a single ground wire. The two lead wires for contact sensor element 41 are separate to the lead wires for the thin-film resistor heater elements, and are independent. In the example shown in FIG. 8, the single lead wire 43 which connects contact sensor element 41 is a ground wire. The signal from contact center element 41 may be transmitted differentially.

In order to electrically connect magnetic recording element 2, magnetic playback element 3 and first thin-film resistor heater element 4, second thin-film resistor heater element 40 and the lead wire of contact sensor element 41 externally, magnetic recording element terminals 60, magnetic playback element terminals 62, terminal 64 for first thin-film resistor heater element 4, terminal 66 for second thin-film resistor heater 40, terminals 67, 75 for contact sensor element and heater element ground terminal 68 are formed on air outflow end 14. In this way, one embodiment reduces the number of terminals by sharing the ground wires of the heater elements. Even where the ground wires are shared, one embodiment independently controls the two heater elements 4, 40 by applying separate signals independently to the other wires. Moreover, one embodiment accurately detects contact by having the input/output wires for contact sensor element 41 independent from the input/output wires of the heater elements.

Figure 9:
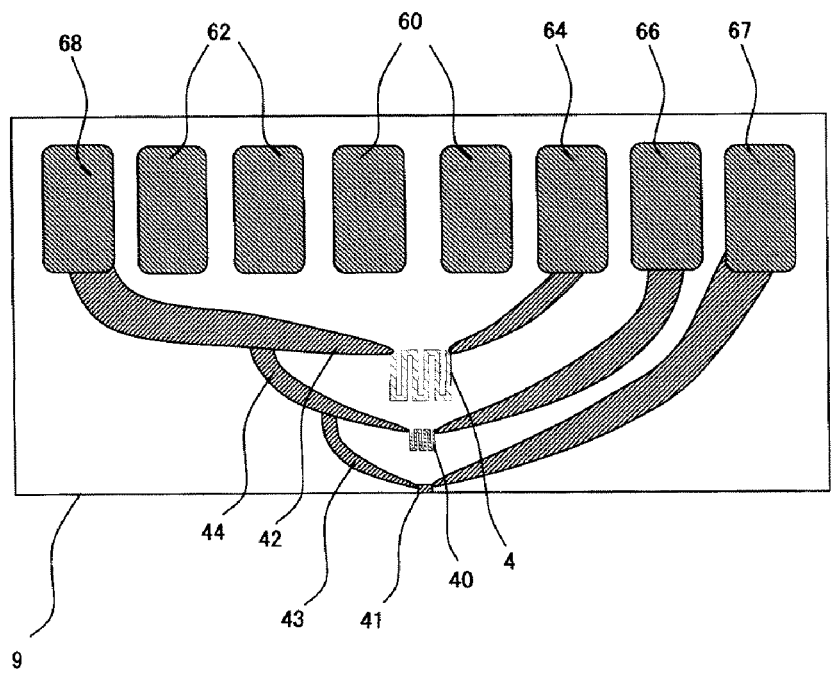
FIG. 9 is a block diagram of an 8-terminal wiring structure in the magnetic head slider in accordance with an embodiment of the present invention.

FIG. 9 is a diagram showing a view from the outflow end of an 8-terminal wiring structure with ground wire 42 of first resistor heater element 4, ground wire 44 of the second thin-film resistor heater element 40, and ground wire 43 of contact sensor element 41 connected together in a single ground wire. In order to electrically connect the lead wires of magnetic recording element 2, magnetic playback element 3, first thin-film resistor heater element 4, second thin-film resistor heater element 40, and contact sensor element 41 externally, magnetic recording element terminals 60, magnetic playback element terminals 62, terminal 64 for first thin-film resistor heater element 4, terminal 66 for second thin-film resistor heater element 40 and contact sensor element terminal 67 and ground terminal 68 are formed on air outflow end 14. In this way, by sharing the ground wires, one embodiment manages by having two more terminals, even where 3 types of thin-film resistor are being controlled.

Figure 10:
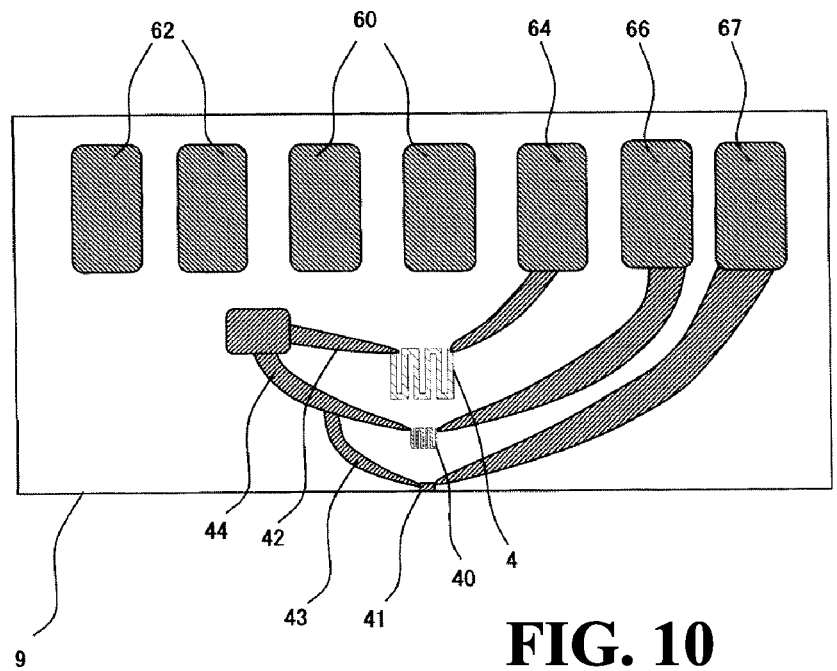
FIG. 10 is a block diagram of a 7-terminal wiring diagram in the magnetic head slider in accordance with an embodiment of the present invention.

The wiring structure shown in FIG. 10, in the same way as for the structure in FIG. 8, has ground wire 42 for first thin-film resistor heater element 4, ground wire 44 for second thin-film resistor heater element 40, and ground wire 43 for contact sensor element connected together in one ground wire. Moreover, in this wiring structure, the shared ground wire is connected to altec substrate 1b which is connected to the ground. Thus, one embodiment eliminates ground wire 68 for first thin-film resistor heater element 4, second thin-film resistor heater element 40, and contact sensor element 41 resulting in a 7-terminal wiring structure with the existing 6-terminal structure increased by a single terminal.

Figure 11:
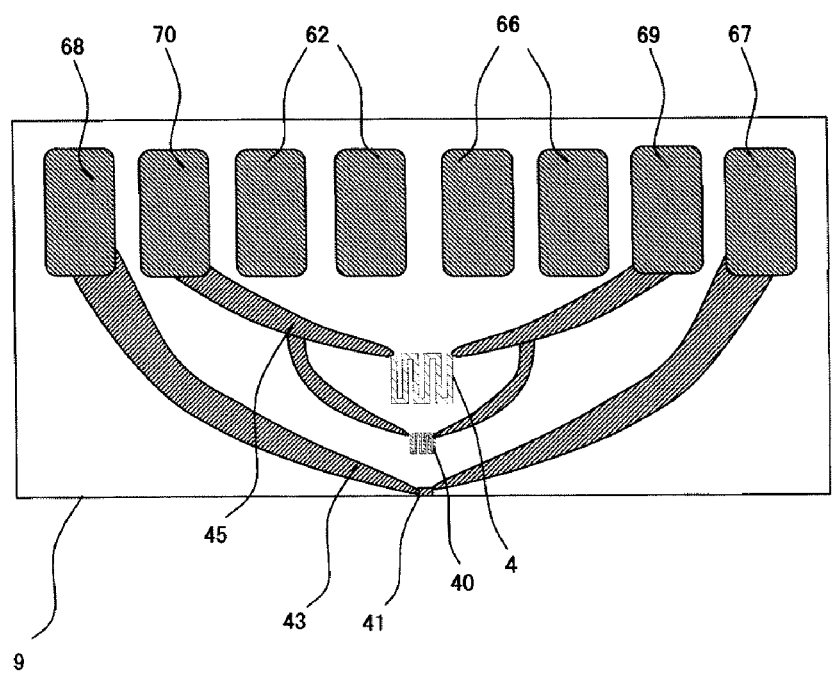
FIG. 11 is a block diagram of an 8-terminal wiring structure where two heater elements are connected in parallel in accordance with an embodiment of the present invention.
Figure 12:
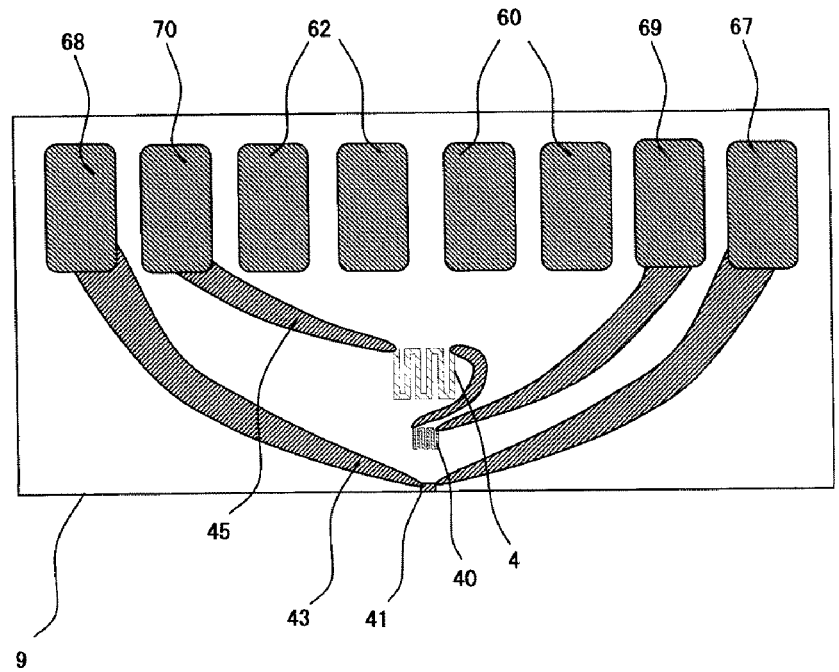
FIG. 12 is a block diagram of an 8-terminal wiring structure where two heater elements are connected in series in accordance with an embodiment of the present invention.

Moreover, if the circuit for adjusting the floating height is combined into one system with first thin-film resistor heater element 4 and second thin-film resistor heater element 40 connected in parallel or series, one embodiment may have a total of 8 terminals with two terminals 67, 68 for contact sensor element 41, two terminals 60 for the magnetic recording element, and two terminals 62 for magnetic playback element as shown in FIGS. 11, 12. In FIG. 11 first thin-film resistor heater element 4 and second thin-film resistor heater element 40 are connected in parallel, and in FIG. 12 they are connected in series. With this kind of structure, the design for the resistance values can be arranged so that the relative heat radiated from the two heater elements is the calculated value. This point will be the same for the following structure.

Figure 13:
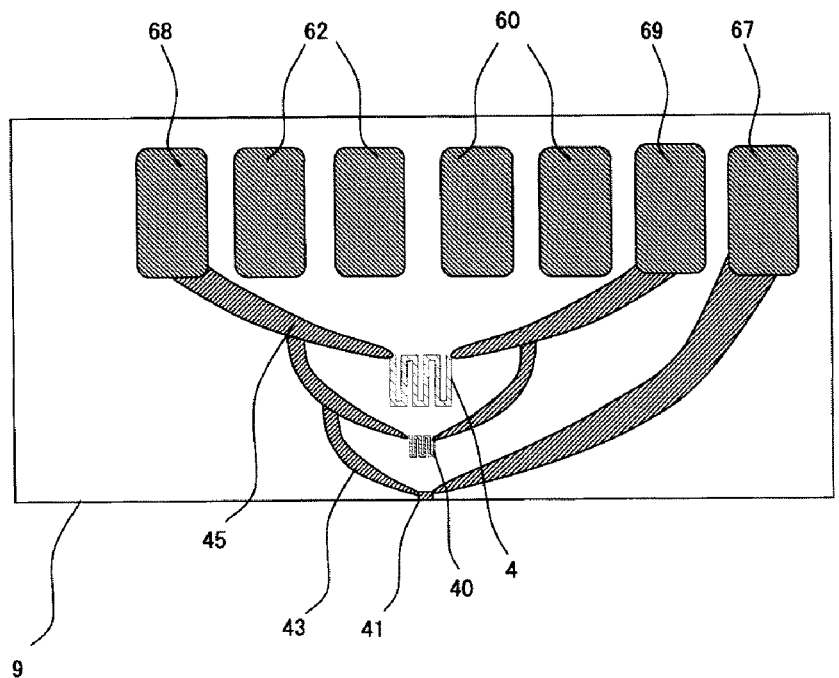
FIG. 13 is a block diagram of a 7-terminal wiring structure where two heater elements are connected in parallel in accordance with an embodiment of the present invention.
Figure 14:
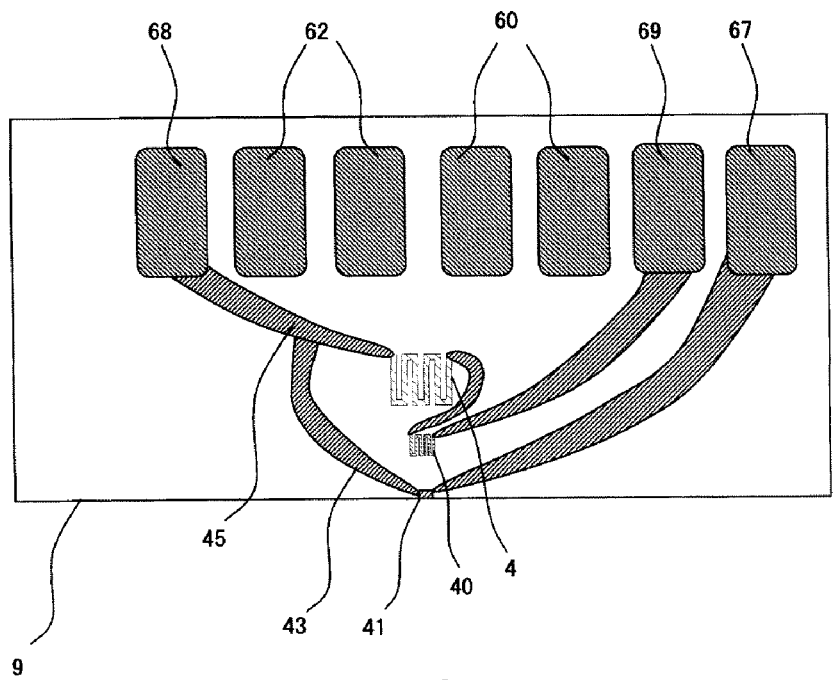
FIG. 14 is a block diagram of a 7-terminal wiring structure where two heater elements are connected in series in accordance with an embodiment of the present invention.

Moreover, as shown in FIGS. 13, 14 one embodiment has a wiring structure with 7 terminals by sharing the ground for the adjustment of the floating height, e.g., between first thin-film resistor heater element 4 and second thin-film resistor heater element 40, and the ground for contact sensor element 41. In FIG. 13, first thin-film resistor heater element 4 and second thin-film heater resistor elements 40 are connected in parallel, but in FIG. 14 they are connected in series.

Figure 15:
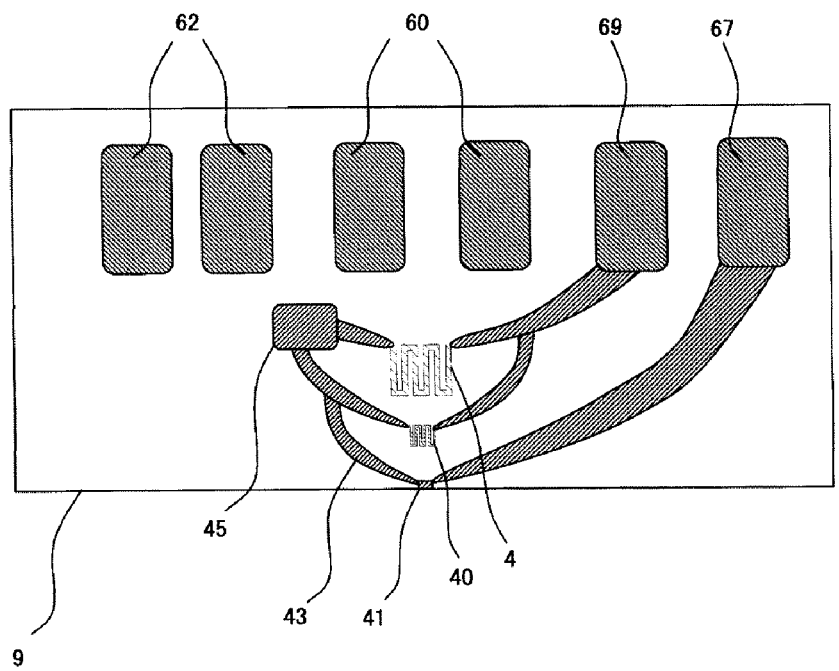
FIG. 15 is a block diagram of a 6-terminal wiring structure where two heater elements are connected in parallel in accordance with an embodiment of the present invention.
Figure 16:
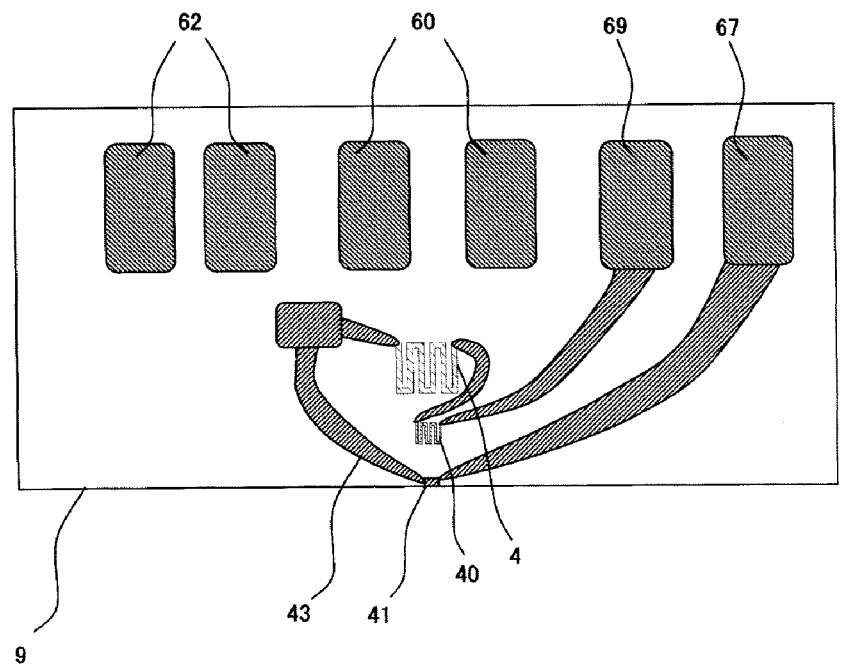
FIG. 16 is a block diagram of a 6-terminal wiring structure where two heater elements are connected in series in accordance with an embodiment of the present invention.

Alternatively, as shown in FIG. 15, 16, one embodiment reduces the number of terminals still further by sharing the ground for adjusting the floating height and the ground of contact sensor element 41, and moreover connecting this shared wire to the ground through altec slider substrate 1a. The number of terminals in this wiring structure is 6, the same as in the current state. In FIG. 15, first thin-film resistor heater element 4 and second thin-film resistor heater element 40 are connected in parallel, and in FIG. 16 they are connected in series.

In the above embodiments, a femto slider has been described as an example with a thickness of 0.23 mm, however, another embodiment may form 8 terminals on the output end surface of the slider even where the slider thickness is as low as 0.1 mm provided that they are terminals with a size of around 80 μm each.

The foregoing descriptions of specific embodiments of the present invention have been presented for purposes of illustration and description. They are not intended to be exhaustive or to limit the invention to the precise forms disclosed, and many modifications and variations are possible in light of the above teaching. An embodiments described herein were chosen and described in order to best explain the principles of the invention and its practical application, to thereby enable others skilled in the art to best utilize the invention and various embodiments with various modifications as are suited to the particular use contemplated.

What is claimed is:

1. A magnetic head slider comprising:
    a slider substrate having an air bearing surface; and
    a laminated magnetic head element on the slider substrate, the laminated magnetic head element comprising:
        a magnetoresistance effect element;
        a recording magnetic pole formed in a layer further from the slider substrate than the magnetoresistance effect element;
        a first thin-film resistor heater element formed in a position further from the air bearing surface than the magnetoresistance effect element and the magnetic recording pole;
        a second film resistor heater element in a layer closer to the slider substrate than the first thin-film resistor heater element, and closer to the air bearing surface and the magnetoresistance effect element than the first heater element; and
        a thin-film resistor sensor element formed in a layer further from the slider substrate than the second thin-film heater element and closer to the air bearing surface than the second heater element.

2. The magnetic head slider of claim 1 wherein the second thin-film resistor heater element is formed in a layer closer to the slider substrate than the magnetoresistance effect element.

3. The magnetic head slider of claim 1 wherein the first thin-film resistor heater element is formed in a layer between the magnetoresistance effect element and the magnetic recording pole.

4. The magnetic head slider of claim 1 wherein the thin-film resistor contact sensor element is positioned closer to the recording magnetic pole in the direction of lamination than the first thin-film resistor heater element.

5. The magnetic head slider of claim 1 wherein the thin-film resistor contact sensor element is smaller than the first and second thin-film resistor heater elements.

6. The magnetic head slider of claim 5 wherein the second thin-film resistor heater element is smaller than the first thin-film resistor heater element.

7. The magnetic head slider of claim 1 wherein a ground for the first and second thin-film resistor heater elements is shared.

8. The magnetic head slider of claim 7 wherein an input line and an output line for the thin-film resistor contact sensor element are independent from the first and second thin-film resistor heater elements.

9. A magnetic disk drive comprising:
    a magnetic head slider which accesses a magnetic disk, the magnetic head slider comprising:
        a slider substrate having an air bearing surface; and
        a laminated magnetic head element formed on this slider substrate, the laminated magnetic head element comprising:
            a magnetoresistance effect element;
            a magnetic recording pole formed in a layer further from the slider substrate the magnetoresistance effect element;
            a first thin-film resistor heater element formed in a position further from the air bearing surface than the magnetoresistance effect element and the recording magnetic pole;
            a second thin-film resistor heater element in a layer closer to a slider substrate than the first thin-film resistor heater element, and closer to the air bearing surface than the first heater element; and a thin-film resistor contact sensor element formed in a layer further from the slider substrate than the second thin-film resistor heater element and closer to the air bearing surface than the second heater element;

a head-moving mechanism which supports the magnetic head slider above the magnetic disk and moves the magnetic head slider over the magnetic disk;

a power supply circuit which supplies electric power to the magnetic head slider; and a controller which controls the power supply circuit, the controller supplying less power from the power supply circuit to the second heater element than to the first heater element.

10. The magnetic disk drive of claim 9 wherein the second film resistor heater element is formed in a layer closer to the slider substrate than the magnetoresistance effect element.

11. The magnetic disk drive of claim 9 wherein the first thin-film resistor heater element is formed in a layer between the magnetoresistance effect element and the recording magnetic pole.

12. The magnetic disk drive of claim 9 wherein the thin-film resistance contact sensor element is positioned closer to the recording magnetic pole in the direction of lamination than the first thin-film resistor heater element.

13. The magnetic disk drive of claim 9 wherein the thin film resistor contact sensor element is smaller than the first and second thin-film heater resistor elements.

14. The magnetic disk drive of claim 13 wherein the second film resistor heater element is smaller than the first thin-film resistor heater element.

15. The magnetic disk drive of claim 9 wherein a ground for the first and second film resistor heater elements is common.

* * * * *